United States Patent
Sharma (10) Patent No.: US 11,256,363 B2
(45) Date of Patent: Feb. 22, 2022

(54) METHOD AND SYSTEM FOR NOISE IMMUNITY FOR AUTOMATICALLY TRIGGERED IMPEDANCE AND CAPACITANCE SENSORS

(71) Applicant: Microchip Technology Incorporated, Chandler, AZ (US)

(72) Inventor: Attma Sharma, Chandler, AZ (US)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 0 days.

(21) Appl. No.: 17/336,475

(22) Filed: Jun. 2, 2021

(65) Prior Publication Data

US 2022/0019312 A1    Jan. 20, 2022

Related U.S. Application Data (60) Provisional application No. 63/052,838, filed on Jul. 16, 2020.

(51) Int. Cl.
*G06F 3/041*    (2006.01)
*G06F 3/044*    (2006.01)

(52) U.S. Cl.
CPC ............ *G06F 3/0418* (2013.01); *G06F 3/044* (2013.01); *G06F 2203/04108* (2013.01)

(58) Field of Classification Search
None
See application file for complete search history.

(56) References Cited

U.S. PATENT DOCUMENTS

| 10,365,775 B2 | 7/2019 | Sharma |
| 10,437,344 B2 | 10/2019 | Sharma |
| 2013/0176272 A1* | 7/2013 | Cattivelli ............ G06F 3/04166 |
| | | 345/174 |
| 2018/0232078 A1 | 8/2018 | Choi et al. |

FOREIGN PATENT DOCUMENTS

EP          3405855 A1    11/2018 ............. G06F 3/041

OTHER PUBLICATIONS

International Search Report and Written Opinion, Application No. PCT/US2021/041911, 14 pages, dated Oct. 29, 2021.

\* cited by examiner

*Primary Examiner* — Stephen T. Reed
(74) *Attorney, Agent, or Firm* — Slayden Grubert Beard PLLC (57) ABSTRACT

A sensor system includes a receiver circuit including a receiver electrode, a transmitter electrode, and control logic. The control logic is configured to determine that an amplitude of a transmitter electrode output signal is greater than an amplitude threshold. Based on this determination, the control logic is configured to whether a frequency of the transmitter electrode output signal is within an allowed frequency range. Based on a determination that the frequency of the transmitter electrode output signal is not within the allowed frequency range, the control logic is configured to determine that noise is present in the system.

18 Claims, 4 Drawing Sheets

FIG. 5

METHOD AND SYSTEM FOR NOISE IMMUNITY FOR AUTOMATICALLY TRIGGERED IMPEDANCE AND CAPACITANCE SENSORS

PRIORITY

This application claims priority to U.S. Provisional Patent Application No. 63/052,838 filed Jul. 16, 2020, the contents of which are hereby incorporated in their entirety.

TECHNICAL FIELD

The present disclosure relates to proximity and touch sensing and, more particularly, to a method and system for noise immunity for automatically triggered impedance and capacitance sensors.

BACKGROUND

A wide variety of touch, proximity, and gesture detection devices are available today. For example, touch, cap-touch, GestIC® 2D and GestIC® 3D technology is available from the assignee of the present application. These function on the principle of Capacitive Voltage Division (CVD) or charge time measurement technique.

Touch, proximity, and gesture detection may use changes in capacitance generated by a body—such as a finger, hand, or stylus—entering a field generated by a transmitter configured to transmit a periodic signal. The receiver may be configured to detect changes to the signals manifested by a change in capacitance. The changes to capacitance itself may be manifested by changes to impedance on the receiver. In many applications, only a single parameter of voltage is used to determine the impedance on a receiver port. This voltage parameter is used in CVD to determine capacitance or impedance and, from this capacitance or impedance, determine a proximity, touch, or gesture. However, inventors of examples of the present disclosure have discovered that using this voltage parameter is prone to noise. Various examples of the present disclosure address issues of noise on input receiver ports to yield more accurate measurements of capacitance or impedance and, consequently, more accurate determinations of touch, proximity, and gestures.

SUMMARY

Examples of the present disclosure include a sensor system. The sensor system may include a receiver circuit including a receiver electrode. The sensor system may include a transmitter electrode. The sensor system may include control logic. The receiver circuit may be configured to oscillate when a capacitance measurement reaches a capacitance threshold. The capacitance measurement may include capacitance between the receiver electrode and the transmitter electrode. The capacitance may indicate a touch or proximity to the sensor system. The capacitance measurement may be performed while the transmitter electrode is deactivated. A capacitance value above a threshold may cause the receiver circuit to oscillate and to activate the transmitter electrode. The control logic may be configured to determine an amplitude of a transmitter electrode output signal. The control logic may be configured to, based on a determination that the amplitude of the transmitter electrode output signal is greater than an amplitude threshold, determine a frequency of the transmitter electrode output signal. The control logic may be configured to determine whether the frequency of the transmitter electrode output signal is within an allowed frequency range. The control logic may be configured to, based on a determination that the frequency of the transmitter electrode output signal is not within the allowed frequency range, determine that noise is present in the system.

Examples of the present disclosure include a method of operating a sensor system with a transmitter electrode and a receiver electrode. The method includes determining a capacitance measurement of a capacitance between a receiver electrode and a transmitter electrode, the capacitance to indicate a touch or proximity to the sensor system. A receiver circuit including the receiver electrode may be configured to oscillate when a capacitance measurement reaches a capacitance threshold. The transmitter electrode may be deactivated until the receiver electrode oscillates. The method may include determining an amplitude of a transmitter electrode output signal after the transmitter electrode is activated. The method may include, based on a determination that the amplitude of the transmitter electrode output signal is greater than an amplitude threshold. The method may include determining a frequency of the transmitter electrode output signal. The method may include determining whether the frequency of the transmitter electrode output signal is within an allowed frequency range. The method may include, based on a determination that the frequency of the transmitter electrode output signal is not within the allowed frequency range, determining that noise is present in the system.

DETAILED DESCRIPTION

Examples of the present disclosure include a sensor system. The sensor system may include one or more receiver circuits, each receiver circuit including a receiver electrode. The sensor system may include a transceiver circuit including a transmitter electrode.

The sensor system may include control logic. The control logic may be implemented by digital circuitry, analog circuitry, instructions for execution by a processor, or any suitable combination thereof.

The receiver circuit may be configured to oscillate when a capacitance measurement reaches a capacitance threshold. The capacitance measurement may include capacitance between the receiver electrode and the transmitter electrode. The capacitance may indicate a touch or proximity to the sensor system. The capacitance measurement may be performed while the transmitter electrode is deactivated. A capacitance value above a threshold may cause the receiver circuit to oscillate and to activate the transmitter circuit. The control logic may be configured to determine an amplitude of a transmitter electrode output signal that results therefrom. The control logic may be configured to, based on a determination that the amplitude of the transmitter electrode output signal is greater than an amplitude threshold, determine a frequency of the transmitter electrode output signal. The control logic may be configured to determine whether the frequency of the transmitter electrode output signal is within an allowed frequency range. The control logic may be configured to, based on a determination that the frequency of the transmitter electrode output signal is not within the allowed frequency range, determine that noise is present in the system.

In combination with any of the above examples, the control logic may be configured to, based on a determination that noise is present in the system, take any suitable remedial or corrective action. For example, the control logic may provide a measurement of the noise to a user of the system, an alert to a user of the system, issue control signals to the transmitter or receiver circuits to adjust for the noise by, for example, changing threshold capacitances or enabling filtering of the detected noise.

In combination with any of the above examples, the control logic may be configured to, based on a determination that the frequency of the transmitter electrode output signal is within the allowed frequency range, determine an amplitude of a receiver electrode output signal. In combination with any of the above examples, the control logic may be configured to determine whether noise is present based upon the amplitude of the receiver electrode output signal. For example, noise may be determined if the amplitude of the receiver electrode output signal is above a threshold, the threshold to indicate the receiver electrode output signal is larger than expected or near saturation.

In combination with any of the above examples, the control logic may be configured to determine whether the amplitude of the receiver electrode output signal is indicative of output saturation. In combination with any of the above examples, the control logic may be configured to, based upon a determination that the receiver electrode output signal is indicative of output saturation, determine that noise is present in the system.

In combination with any of the above examples, the control logic may be configured to apply a zero-oscillation state impedance to the receiver electrode. This may be performed on the basis of, for example, a determination that the amplitude of the receiver electrode output signal is larger than the threshold.

In combination with any of the above examples, the control logic may be configured to determine whether the receiver electrode output signal indicates oscillation of the receiver electrode after the zero-oscillation state impedance is applied. In combination with any of the above examples, the control logic may be configured to determine that noise is present in the system based on an indication of oscillation of the receiver electrode after the zero-oscillation state impedance is applied.

The zero-oscillation state impedance may be applied by an impedance bank or other suitable component of or communicatively coupled to the receiver circuit. The impedance bank may include capacitors, resistors, or any suitable combination thereof to provide a defined impedance. The zero-oscillation state impedance may be sufficient to cause the receiver circuit to not oscillate. The receiver circuit might not oscillate despite any capacitance measurement between the electrodes.

In combination with any of the above examples, the control logic may be configured to determine that the capacitance measurement is correctly observed above the capacitance threshold based upon the determinations that the receiver electrode output signal indicates oscillation of the receiver electrode, and that the transmitter electrode output signal is within the allowed frequency range, after the zero-oscillation state impedance is applied.

In combination with any of the above examples, the control logic may be configured to further determine that the capacitance measurement is above the capacitance threshold based on a determination that the receiver electrode output signal is not indicative of output saturation.

In combination with any of the above examples, the control logic may be configured to determine that the amplitude of the transmitter electrode output signal is less than the amplitude threshold and, based on the determination that the amplitude of the transmitter electrode output signal is less than the amplitude threshold, determine whether a receiver electrode output signal is saturated. In combination with any of the above examples, the control logic may be configured to, based on a determination that the receiver electrode output signal is not saturated, and upon the determination that the amplitude of the transmitter electrode output signal is less than the amplitude threshold, determine that the capacitance measurement is correctly observed below the capacitance threshold.

In combination with any of the above examples, the control logic may be configured to, based on a determination of noise in the sensor system, apply a zero-oscillation state impedance to the receiver electrode, and record the transmitter electrode output signal after application of the zero-oscillation state impedance to characterize the noise.

In combination with any of the above examples, the control logic may be configured to record a receiver electrode output signal after application of the zero-oscillation state impedance to characterize the noise.

Figure 1:
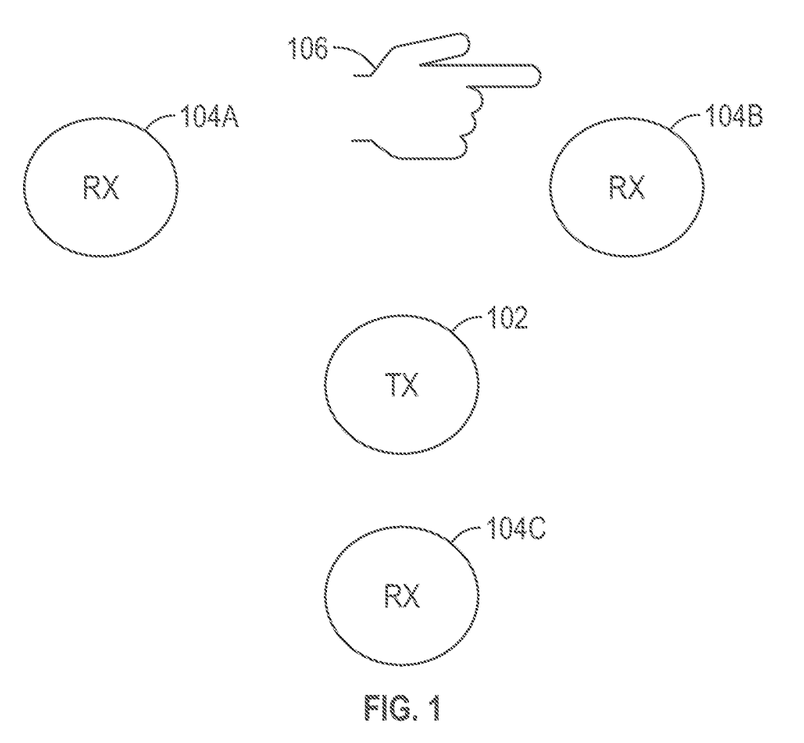
FIG. 1 illustrates an example of an example arrangement of a transmitter electrode and receiver electrodes, according to examples of the present disclosure.

FIG. 1 illustrates an example of an example arrangement of a transmitter electrode and receiver electrodes, according to examples of the present disclosure. This arrangement of a transmitter electrode and receiver electrodes may be implemented within any suitable touch, proximity, or gesture detection for any suitable system. For example, the arrangement of sensors may be included on a mobile smartphone, tablet, or similar device, with the electrode assembly mounted on the outer ring or edge of device. Displays on the device could illustrate portions of the screen above which controls such as volume gestures are to be performed. Moreover, although a certain number of electrodes are arranged in a certain way as shown in FIG. 1, any suitable number of electrodes in any suitable arrangement may be used.

For example, in FIG. 1, a transmitter electrode 102 may be centered relative to receiver electrodes 104A, 104B, 104C around it. In another example (not shown), transmitter electrode 102 may be offset from a center of receiver electrodes 104 to allow room for other circuitry and system components, such as a display screen. In another example (not shown), transmitter electrode 102, receiver electrodes 104, or any combination thereof may be elongated and overlaid in a grid manner of rows and columns. In another example (not shown), a given receiver electrode 104 may be closely located to transmitter electrode 102, in comparison to other receiver electrodes. In another example (not shown), receiver electrodes 104 may be arranged so as to form a virtual keyboard, or detect sensing or touch of virtual keys. Transmitter electrode 102 and receiver electrodes 104 may be implemented in any suitable manner, such as by a semiconductor die, a transmitter circuit, or antennae.

Transmitter electrode 102 and receiver electrodes 104 may have a given capacitance therebetween, or between receiver electrodes 104, or within a given receiver electrode 104. Introduction of a body 106 may perturb the capacitance of receiver electrodes 104. Receiver electrodes 104 may be configured to detect the perturbation caused by body 106 and, based upon resulting measurements, detect a touch, proximity, or gesture. Body 106 may include, for example, a hand, finger, stylus, or any other suitable object gesturing in air about the electrode assembly. Examples of the present disclosure may detect relative positions and motions of body 106. These may be made by comparing measurements from different receiver electrodes 104 from perturbations above receiver electrodes 104.

If the capacitance of a given receiver electrode 104 is sufficiently great, the receiver stage of the given receiver electrode 104 may oscillate, which may in turn cause a transmitter stage of transmitter electrode 102 to begin oscillating. Transmitter electrode 102 may be configured to emit a sinusoidal signal. Receiver electrodes 104 may be configured to receive the sinusoidal signal. The frequencies, phase, and amplitudes of the resulting signals may be used for touch, gesture, or proximity detection. If body 106 has sufficient electrical conductivity (like a human body) the signal from transmitter electrode 102 travels across the palm and other fingers (or other electrically connected parts of object 106) and reaches other receiver electrodes 104 or the original receiver electrode 104. The signal may propagate to varying degrees depending on relative position of the nearest portion of body 106. In one example, by measuring the relative amplitudes of transmitter electrode 102, the phase of the signals generated by receiver electrodes 104, and changes in frequency of the transmitter electrode 102, sufficient information can be obtained to detect relative position and gestures.

Perturbations in the sensing space above receiver electrode 104B as body 106 approaches may be greater than perturbations in the sensing space above, for example, receiver electrodes 104A, 104C. Therefore, measurements would be most useful for touch, proximity, or gesture detection for a receiver channel and stage associated with receiver electrode 104B, compared to the other receiver electrodes 104A, 104C.

Where receiver electrodes 104 are not equidistant, transmitter electrode 102, data detected by receiver electrodes 104 may be weighted accordingly. Furthermore, the data detected by the collective group of receiver electrodes 104 may be analyzed according to the placement of receiver electrodes 104 using any suitable representative impedance network or model (not shown). While the impedance network formed by array of transmitter electrode 102 and receiver electrodes 104 can be quite complex, the circuit operation can be understood by considering only the equivalent impedance between each transmitter and receiver electrode pair. Data may be detected by receiver electrodes 104 when perturbations cause a given receiver electrode 104 to oscillate and generate an output signal.

Figure 2:
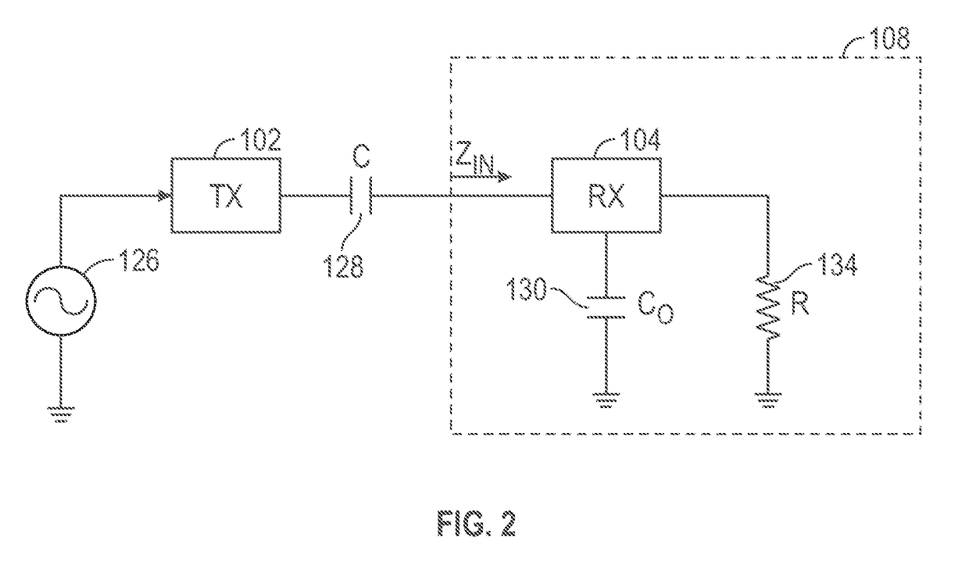
FIG. 2 is an illustration of a model of a transmitter electrode and a receiver electrode, according to examples of the present disclosure.

FIG. 2 is an illustration of a model of a transmitter electrode and a single receiver electrode, according to examples of the present disclosure. The transmitter electrode may be represented by transmitter electrode 102 and the single receiver electrode may be represented by an instance of receiver electrodes 104. The model of FIG. 2 may represent a single channel, of which there are three such channels, one for each receiver electrode 104 in FIG. 1. The model of FIG. 1 may illustrate how changes in capacitance might be detected. The capacitance and resistance elements in FIG. 1 may illustrate the equivalent impedances associated with the receiver electrode 104 and transmitter electrode 102.

FIG. 2 may represent various conceptual portions of a receiver stage 108. Although a simplified model of receiver stage 108 for receiver electrode 104 is illustrated, any suitable implementation of a receiver stage for receiver electrode 104 may be used. Furthermore, a transmitter stage (not shown) may further include various elements, including additional capacitors and resistors.

The capacitance between transmitter electrode 102 and receiver electrode 104 may be represented by C 128. The capacitance may be related to distance of an object to receiver electrode 104, which may be a measure of a distance of the object to a device in which receiver electrode 104. As discussed above, if the capacitance of a given receiver electrode 104 is sufficiently great, the receiver stage of the given receiver electrode 104 may oscillate, which may in turn cause a transmitter stage of transmitter electrode 102 to begin oscillating. The operation of receiver electrode 104 to oscillate may be represented by a logical source 126. Although shown as an actual circuit element, source 126 may represent in the figures the propensity of receiver electrode 104 to oscillate. Thus, source 126 may conditionally issue a transmit signal to transmitter circuit 104. The transmit signal may be a sinusoidal signal when capacitance 128 is above a capacitance threshold value or impedance is within a given range. The transmit signal may be a constant or DC default value when capacitance 128 is below a capacitance threshold of the system, or when impedance is outside the given range. The transmit signal may be sent to the environment, whereupon objects such as hands, a stylus, or a finger may interact with the transmit signal. Resultant signals from the environment may in turn be received by receiver electrode 104 and measured. The gain of the signal as received by receiver electrode 104 divided by the signal as generated by transmitter electrode 102 (Rx/Tx) may be calculated. The resultant signals and gain may be analyzed to determine C 128. Once C 128 is determined, touch or proximity values may be further calculated. A stage of receiver electrode 104 may include an equivalent resistance, given by a resistor R 134 and an inherent capacitance ($C_0$) 130. $C_0$ 130 may be due to particular die or device characteristics. $C_0$ 130 may be constant. Source 102 may experience parasitic capacitance present for other portions of the system.

In FIG. 2, the impedance associated with receiver electrode 104 may be predominantly capacitive. The inherent capacitance $C_0$ 130 may vary with motion of body 106. $C_0$ 130, in semiconductor integrated circuits, may be dominated by the non-linear capacitance of the elements of the die or the integrated circuit pad. The value of R 134 may be chosen by design. When the value of R 134 is made very small, stage transfer function for receiver electrode 104 is effectively independent of $C_0$ 130. While the voltage gain also decreases, this need not be a problem since, in principle, R 134 can be made approximately or exactly zero if the current through R 134 is used as the measured input instead of the voltage across it.

Receiver electrode 104 may be implemented with its inputs as current inputs or voltage inputs. If the input impedance, $Z_{IN}$, for receiver electrode 104 is low but non-zero, then a voltage input may be used and the effects of $C_0$ 130 may be partially eliminated. If the input impedance for receiver electrode 104 is zero, then a current input may be used and the effects of $C_0$ 132 may be eliminated. In such an example, the current out of source 126 will be the current into resistor 134. Since source 126, transmitter 102, C 128, and receiver 108 are in series and resistor 134 is zero or much less than the impedance of $C_O$ 130, then resistor 134 may be the path of least resistance. The current into receiver 108 may thus be found by measuring the current in resistor 134 and considered to be the current input to the receiver stage. Furthermore, a bandpass filter (not shown) might be applied to output of receiver electrode 104.

Design of receiver stage 108 may include selection of circuit layouts, resistors, and capacitors that cause capacitance thresholds for C 128 at which receiver stage 108 will oscillate and provide measurable data. When the measured value of C 128 goes above a lower capacitance threshold, receiver stage 108 may oscillate, driving a transmitter stage (not shown), and receiver stage 108 may receive a signal from transmitter electrode 102. When the measured value of C 128 goes below an upper capacitance threshold, the oscillation of receiver stage 108 may die out and may appear as a decaying burst. The upper capacitance threshold and lower capacitance threshold might be different as a hysteresis to prevent intermittent starting and stopping of the oscillation. Thus, the oscillation of receiver stage 108 and transmitter electrode 102 may depend on the measured value of C 128. Accordingly, in one example, receiver circuits and stages (such as receiver stage 108) do not need to be specifically polled nor do transmitter stages (not shown) need to be externally driven, but instead are activated when the value of C 128 is above capacitance thresholds for oscillation.

Figure 3:
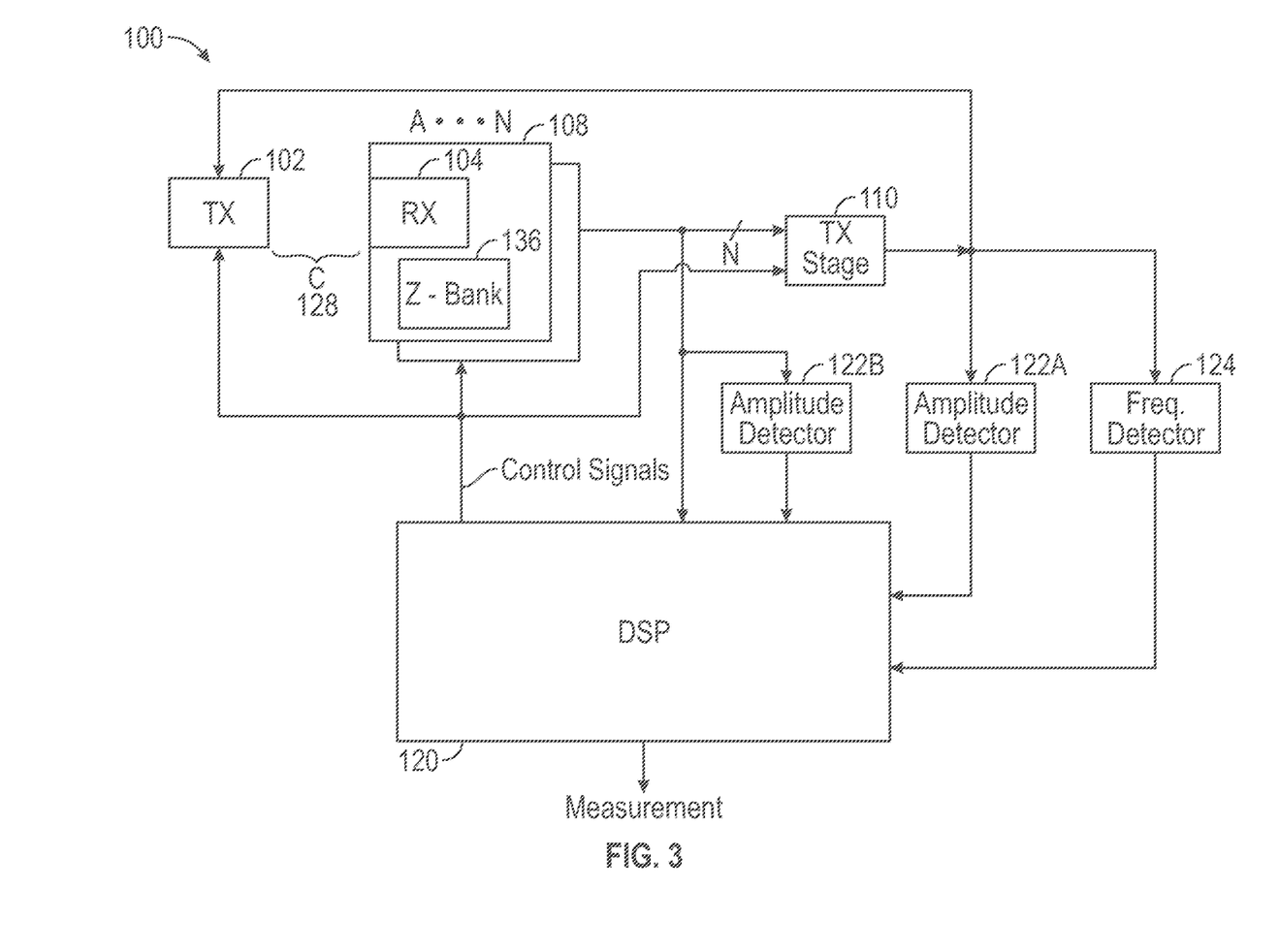
FIG. 3 is an illustration of a system for touch sensing, according to examples of the present disclosure.

FIG. 3 illustrates an example system 100 for touch, proximity, or gesture sensing, according to examples of the present disclosure. System 100 may include instances of various elements of FIGS. 1-2. System 100 may be implemented within a computer, mobile device, tablet, or any other device for determining proximity or touch detection, or other capacitance sensing. System 100 may, given input signals received from transmitter electrode 102 and receiver electrodes 104, determine whether or not an object (not shown) is approaching or has touched a sensor. This determination may be issued as measurement and decision data output.

System 100 may include any suitable number and kind of sensing elements. For example, system 100 may include a transmitter electrode 102. System 100 may include one or more receiver stages 108. Each receiver stage 108 may include an instance of a receiver electrode 104. System 100 may include a transmitter stage 110 configured to drive transmitter electrode 102 upon receiving an output from one or more receiver stages 108, wherein the receiver stage 108 output is to be generated upon oscillation of receiver stage 108 when capacitance 128 is above a lower capacitance threshold. A single instance of transmitter stage 110 may be provided per instance of receiver stage 108. Moreover, a single instance of transmitter stage 110 may be shared between multiple instances of receiver stage 108. Output of receiver stages 108 may be summed, added together, combined, or otherwise processed together. The measured capacitance C of each of receiver stages 108 might include internal capacitance to the given receiver stage 108 and capacitance between respective receiver electrodes 104 and transmitter electrode 102. The particular capacitance threshold values of C 128 may be set according to application needs, such as values corresponding to particular objects (gloved or ungloved hands), protected or unprotected touch surfaces, distances, or other suitable criteria. Each of receiver stages 108 and transmitter stage 110 may be implemented by analog circuitry, digital circuitry, instructions for execution by a processor, or any suitable combination thereof.

In one example, receiver stages 108 may include an impedance bank 136. Impedance bank 136 may include capacitors, resistors, or any suitable combination thereof to provide a defined impedance. Receiver stage 108 may be configured to, upon receipt of a control signal, switch, apply, or otherwise engage impedance bank 136 to the input impedance measured by receiver electrode 104. The value of impedance bank 136 may be sufficient to cause a zero-oscillation state of receiver stage 108, regardless of the actual capacitance between receiver electrode 104 and transmitter electrode 102. The value of impedance bank 136 may be variable and selectable. Thus, even if capacitance between receiver electrode 104 and transmitter electrode 102 is sufficiently changed to otherwise cause receiver stage 108 to oscillate, such oscillation may be prevented.

System 100 may include any suitable parameter measurement and processing elements. For example, system 100 may include a digital signal processor (DSP) 120, amplitude detectors 122, and frequency detector 124. Each of these may be implemented by analog circuitry, digital circuitry, instructions for execution by a processor, or any suitable combination thereof.

Output of receiver electrode 104 may be routed through any suitable filtering or process within receiver stage 108. Output of receiver electrode 104 may then be provided to any suitable portion of system 100. For example, output of receiver electrode 104 may be provided to amplitude detector 122B and control logic. The control logic may be included in any suitable analog circuitry, digital circuitry, or instructions for execution by a processor. The control logic may be included in, for example, DSP 120. Amplitude detector 122B may be configured to measure the amplitude of output of receiver electrode 104.

Output of transmitter electrode 102 may be configured to be provided to amplitude detector 122A and to frequency detector 124. Amplitude detector 122A may be configured to measure the amplitude output of transmitter electrode 102. Frequency detector 124 may be configured to measure the frequency of transmitter electrode 102. In one example, while frequency and amplitude of the transmitted signal and the amplitude of the received signal are available, the amplitude of the received signal may be all that is used. The amplitude of the received signal may be used to determine if receiver stage 108 is being overdriven into saturation by noise.

Figure 4:
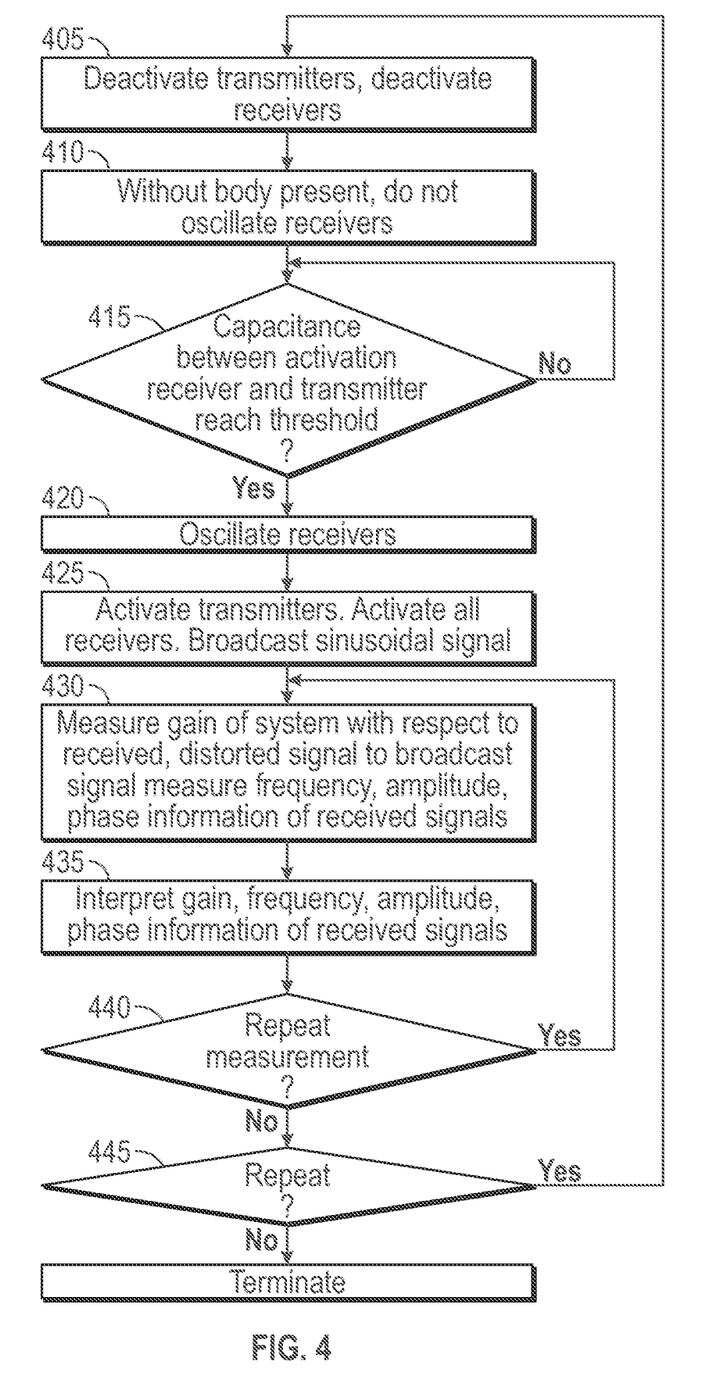
FIG. 4 is an illustration of an example method for touch sensing, according to examples of the present disclosure.

FIG. 4 illustrates a flow chart of a method 400 for sensing capacitance changes, according to examples of the present disclosure.

Method 400 may be implemented by any suitable mechanism, such as the elements of FIGS. 1-3. Method 400 may optionally repeat or terminate at any suitable point. Moreover, although a certain number of blocks are illustrated to implement method 400, the blocks of method 400 may be optionally repeated, performed in parallel or recursively with one another, omitted, or otherwise modified as needed. For example, 420 and 425 may occur simultaneously. Method 400 may initiate at any suitable point, such as at 405.

At 405, transmitters may be deactivated. Moreover, receivers may be deactivated. At 410, receivers might not oscillate or activate to propagate output signal.

At 415, it may be determined whether capacitance has reached a capacitance threshold. The capacitance may have reached a lower capacitance threshold after falling or an upper capacitance threshold after rising. The capacitance change may be due to an object approaching a given receiver electrode. The capacitance determination may be made by a receiver stage configured to activate or oscillate only after a certain capacitance threshold has been reached. The capacitance may include capacitance between the a given receiver and a transmitter. The capacitance may also include capacitance internal to the receiver. In one example, the capacitance measurements may be replaced by impedance measurements.

If capacitance thresholds have been reached, method 400 may proceed to 420. Otherwise, 415 may repeat. At 420, the receivers may oscillate.

At 425, the transmitters may be activated. Other receivers may be activated. A broadcast signal may be provided to the transmitters.

At 430, the gain may be measured. The gain may be of the system and receiver stages with respect to the received, distorted signal resulting from the broadcast signal interacting with a body. Furthermore, frequency, amplitude, and phase information of the received signals may be measured.

At 435, the data collected may be interpreted as gestures.

At 440, it may be determined whether measurements of the body's effects to be translated to gestures will continue. If so, method 400 may repeat at 430. Otherwise, method 400 may proceed to 445.

At 445, it may be determined whether method 400 will repeat. If so, method 400 may repeat at, for example, 410. Otherwise, method 400 may terminate.

Returning to FIG. 3, in one example, detection of a body for a given receiver electrode 104 may be performed in a pseudo-binary manner. When the capacitance observed by a given electrode receiver 104 is below a given, programmed capacitance threshold, there should be no signal received from either receiver electrodes 104 or to transmitter electrode 102. When the capacitance is above the given, programmed capacitance threshold, the received signal sent to transmitter electrode 102 should be of a known frequency. This known frequency may be the characteristic frequency of system 100. Just as the characteristic frequency of an oscillator is defined by the particular components and topology of such a circuit, the characteristic frequency of system 100 may be defined by the specific circuit topology and design values of resistors and capacitors in system 100.

Accordingly, in one example any signal received from receiver electrodes 104 or transmitter electrode 102 when the capacitance is below a given, programmed capacitance threshold may be considered to be noise. DSP 120 may be configured to, upon determining that signals from receiver electrode 104 indicate that capacitance is below the given capacitance threshold, measure the response received from transmitter electrode 102. The response may be used to characterize noise experienced by system 100.

Furthermore, in one example any signal received from transmitter electrode 102 that varies from this known frequency when the capacitance is above a given, programmed capacitance threshold may be considered to be noise. DSP 120 may be configured to, upon determining that signals from receiver electrode 104 indicate that capacitance is above the given capacitance threshold, measure the response received from transmitter electrode 102 using frequency detector 124. Deviations from the expected, known frequency by the received signal from the transmitter electrode 102 may be used to characterize noise experienced by system 100.

DSP 120 may take any suitable corrective action based upon noise characterized in system 100. For example, DSP 120 may provide a measurement of the noise to a user of system 100 to a memory (not shown). DSP 120 may provide an alert to a user of system 100. DSP 120 may issue control signals to source 126, transmitter electrode 102, receiver stage 108, or transmitter stage 110. The control signals may adjust operation of system 100 by changing threshold capacitances in view of the detected noise. The control signals may adjust operation of system 100 by enabling filtering of the detected noise in any suitable portion of system 100.

Furthermore, the amplitude of the signal generated by transmitter electrode 102, the frequency of the signal generated by transmitter electrode 102, and the phases of the signal generated by receiver electrodes 104 may be evaluated to characterize the noise experienced by system 100. This may be performed by DSP 120. For example, if the amplitude of the signal generated by transmitter electrode 102 indicates that transmitter electrode 102 and receiver electrodes 104 are activated, then the frequency of the signal generated by transmitter electrode 102 may be evaluated. If the frequency of the signal generated by transmitter electrode 102 is within an expected range, then the phases of the signal generated by receiver electrodes 104 may be evaluated.

Accordingly, DSP 120 may be configured to measure an amplitude of the signal generated by transmitter electrode 102 using amplitude detector 122A. DSP 120 may be configured to compare this amplitude against an amplitude threshold. The amplitude threshold may be sufficiently high so that if the amplitude of the signal generated by transmitter electrode 102 exceeds the amplitude threshold, it may indicate that transmitter electrode 102 is or should be oscillating. DSP 120 may then perform additional analysis of frequency and amplitude of transmitter electrode 102 signals, and of phase and amplitude of receiver electrode 104 signals.

DSP 120 may be configured to measure a frequency of the signal generated by transmitter electrode 102 using frequency detector 124. This may be performed upon an initial determination that the signal generated by transmitter electrode 102 is greater than the amplitude threshold indicating that transmitter electrode 102 is or should be oscillating. DSP 120 may be configured to compare the measured frequency against a range of operational frequencies. The band of operational frequencies may include minimum and maximum values selected according to manufacturing process, voltage, and temperature variation. For example, if resistors and capacitors vary by +/−10% in value, there may be a +/−20% variation about the nominal frequency value. If the measured frequency is outside of the designated operational frequency range, then noise may be detected. Furthermore, the data signals might be invalid. A check may be made using other methods for noise, such as saturation of output of receiver stage 108. If saturation or significant noise is found, then the event may be a false positive and sensor operations may continue.

When the amplitude of the signal generated by transmitter electrode 102 is greater than the amplitude threshold, DSP 120 may be configured to measure the amplitude of the signals generated by receiver stages 108 through amplitude detector 122B. If the amplitude is near saturation, then noise may be detected. In normal operation, when C 128 is above a capacitance threshold, then the triggered oscillation is such that the amplitude of the signal of receiver 104 is smaller than the amplitude of the signal of transmitter 102 by a fractional scale factor that depends on the design. For most designs, receiver 104 might have a signal strength that is less than half of the signal for transmitter 102 when oscillation triggered by C 128 goes above the capacitance threshold. Therefore, if measured amplitude of receiver 104 is greater than half of the signal of transmitter 104, there is likely noise in the system. Furthermore, if the amplitude of receiver 104 is within a close percentage—such as 10%—of the saturation level (the maximum possible voltage value), then it is due to external noise. Saturation may be the signal of receiver 104 reaching a minimum or maximum value that is possible given a supply voltage. Moreover, if the amplitude is significantly higher or lower than an expected value, then noise or damage to a circuit may be detected. As discussed above, the expected value of the signal of receiver 104 may be no more than half of the signal to transmitter 102 and may typically be an expected value of one-fifth.

Noise in system 100 may cause transmitter electrode 102 to appear to be oscillating, and thus generate measurable signals to DSP 120, even when transmitter electrode 102 has not actually been activated by transmitter stage 110. Moreover, noise or damage in system 100 may cause transmitter electrode 102 to appear to not be oscillating, even when transmitter electrode 102 should have been activated by transmitter stage 110. Transmitter stage 110 should activate oscillation of transmitter electrode 102 based upon oscillation of receiver stage 108 and should end oscillation based upon no oscillation of receiver stage 108. Thus, in one example, DSP 120 may be configured to determine whether capacitance representing a body approaching or touching receiver electrodes 104 is definitively sensed or not sensed. This may include determining whether the capacitance between receiver electrodes 104 and transmitter electrode 102 is definitively determined to be above or below the threshold capacitance wherein receiver stage 108 should oscillate.

For example, DSP 120 may measure the amplitude of the signal generated by transmitter electrode 102 and determine that the amplitude is greater than the amplitude threshold that indicates that transmitter electrode 102 is or should be oscillating. DSP 120 may then evaluate whether the frequency of the signal generated by transmitter electrode 102 is within the designated operational frequency range. If the measured frequency is within the designated operational frequency range, DSP 120 may be configured to perform additional analysis while adjusting values of impedance bank 136 across to the output of receiver electrode 104 and transmitter electrode 102. DSP may be configured to issue a control signal to receiver stage 108 to cause receiver stage 108 to switch or otherwise modify impedance bank 136 to cause receiver stage 108 to not oscillate. If the measured frequency is within the designated operational frequency range and thus receiver stage 108 is oscillating, DSP 120 may cause application of impedance bank 136 so that receiver stage 108 is expected to stop oscillating. If, after so modifying impedance bank 136, oscillation of transmitter electrode 102 is still detected through, for example, amplitude detector 122A or frequency detector 124, then noise or errors may be detected. At this point, a signal may have been detected wherein there should not have been a signal. This may be noise that overwhelms correct output of receiver stage 108 or may reflect an error in operation of receiver stage 108. Corrective actions such as reporting that there is noise present may be made, wherein users may disregard system results as untrustworthy. Moreover, signal amplitude of receiver 104 may be checked. If this signal is not near saturation, then frequency may be checked. If the frequency is outside of an operational range, then the component of frequency that was previously detected to be within operational range was due to port capacitance 128 being above a capacitance threshold despite the presence of some noise. System 100 may report with high probability of accuracy that capacitance 128 above capacitance threshold has been detected. If the frequency is still within the operational range, then system 100 may shift its characteristic frequency (through control signals to switch in different resistance and capacitance values in receiver stage 108 or transmitter stage 110) and the test repeated. If receiver 104 signal amplitude is near or at a saturation level, then system 100 may report that there is overwhelming noise present and system results cannot be trusted.

Furthermore, if transmitter electrode 102 is oscillating regardless of application of various levels of impedance bank 136, then DSP 120 may be configured to determine that the environment in which system 100 resides is constantly noisy or is being operated outside of its design range specification. In addition, if oscillation of receiver stage 108 ends upon application of impedance bank 136, then capacitance 128 between receiver electrodes 104 and transmitter electrode 102 is definitively determined to be above the capacitance threshold indicating approach or touch of a body.

In another example, if DSP 120 determines that transmitter electrode 102 appears to not be oscillating based on a signal received from transmitter electrode 102 below the capacitance threshold indicating approach or touch of a body, and if DSP 120 also determines that output of receiver stage 108 is not saturated, then DSP 120 may be configured to determine that capacitance below the capacitance threshold is definitively sensed.

In yet another example, if DSP 120 determines that transmitter electrode 102 appears to be operating outside of the allowable frequency operation band, and if DSP 120 also determines that output of receiver stage 108 is not saturated, then DSP 120 may be configured to determine that capacitance below the capacitance threshold is definitively sensed.

If DSP 120 determines that output of receiver stage 108 is saturated, or if the output of transmitter electrode 102 is saturated, the DSP 120 may be configured to determine that system 100 is saturated with noise. For example, if the frequency of the output of transmitter electrode 102 is within the operational frequency range, but the amplitude of the output of transmitter electrode 102 is so large that it drives the output into saturation, noise may be detected. Specifically, DSP 120 may be configured to measure the amplitude of the output signal from receiver stage 108 and determine whether it is greater than the value expected for a full-scale sensor-triggered oscillation of receiver electrode 104. If so, this may indicate noise injection. At this point of noise saturation, system 100 may be overwhelmed by noise. Having this information may be useful. A user of system 100 may be notified, or other corrective actions may be taken. For example, transmitter stage 110 may be placed in a high impedance state to further characterize the noise. If the signal for transmitter 102 is measured when transmitter stage 110 is in a high impedance state, and noise still remains, then the noise is most likely being injected at both transmitter 102 and receiver 104 electrodes, and not just at receiver 104. A noise profile may be built to determine whether observed noise is due to an actual touch with the human body acting as an antenna that couples or injects noise into electrodes 102, 104.

Upon determination of noise, DSP 120 may be configured to apply impedance bank 136 so that receiver stage 108 is to not oscillate. This may represent a shut-down or high impedance state. DSP 120 may utilize this state to conduct additional characterization of the noise as part of a corrective action. A noise profile in this state may be captured and stored.

Figure 5:
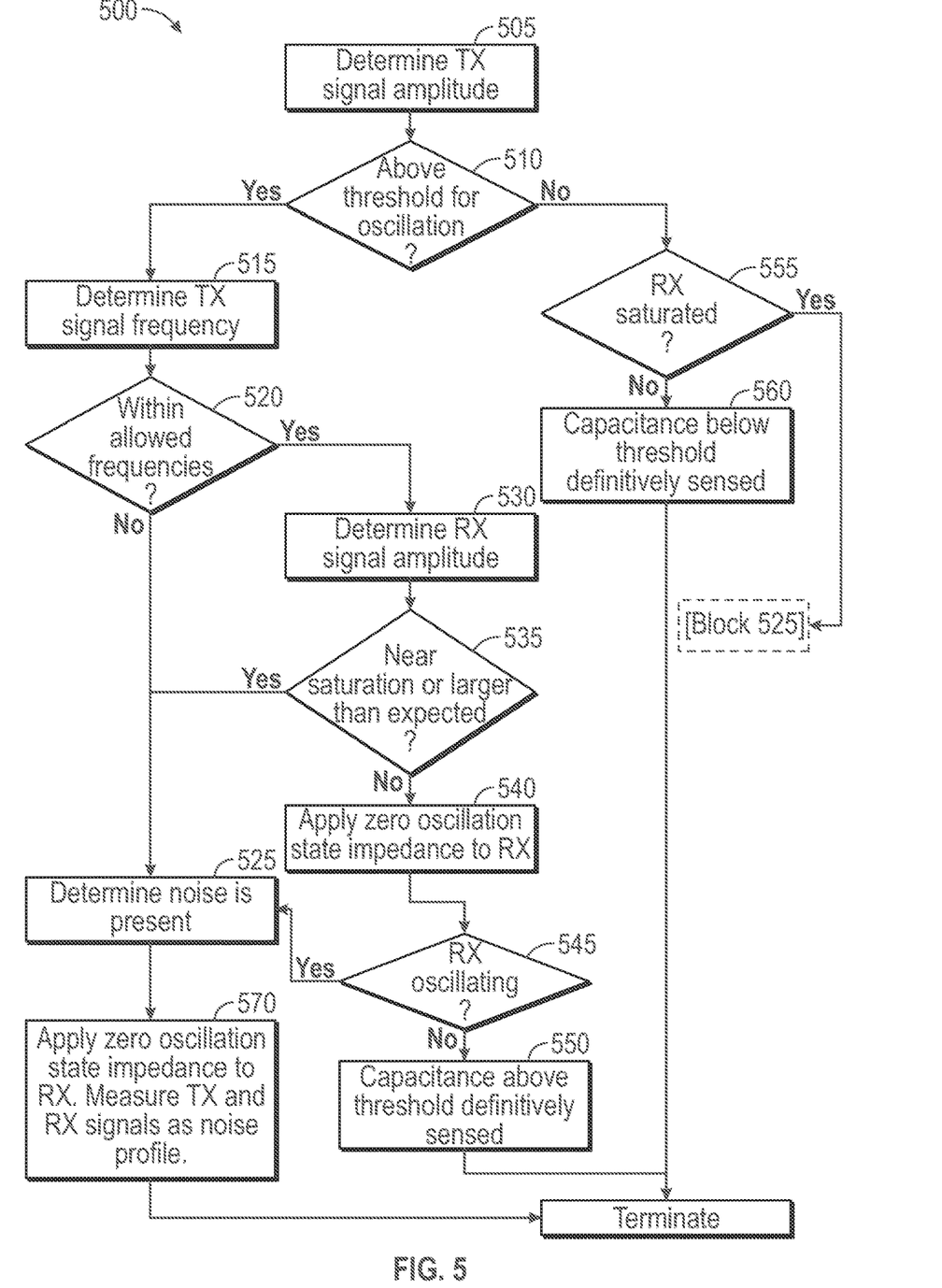
FIG. 5 is an illustration of an example method for analysis of sense data, according to examples of the present disclosure.

FIG. 5 is an illustration of an example method 500 for analysis of sense data, according to examples of the present disclosure.

Method 500 may be implemented by any suitable mechanism, such as the elements of FIGS. 1-3. In particular, method 500 may be implemented fully or in part by control logic. The control logic may be included in DSP 120. Furthermore, method 500 may implement block 435 of method 400, fully or in part. Method 500 may optionally repeat or terminate at any suitable point. Moreover, although a certain number of blocks in a certain order are illustrated to implement method 500, the blocks of method 500 may be optionally repeated, performed in parallel or recursively with one another, reordered, omitted, or otherwise modified as needed. For example, blocks regarding receivers in method 500 may be performed in parallel for multiple receivers or receiver channels of a system. Method 500 may initiate at any suitable point, such as at block 505.

At block 505, a transmitter signal may be determined, such as output of transmitter electrode 102. The amplitude of the transmitter signal may be determined.

At block 510, it may be determined whether this amplitude is above an amplitude threshold level, the threshold level to indicate that capacitance should have reached a threshold, further indicating that a body has touched or approached the sensing system performing method 500. In addition, this may indicate that the transmitter is oscillating. It may also indicate that significant noise has been injected. Accordingly, once the amplitude threshold level has been exceeded, method 500 may proceed to block 515. Otherwise, method 500 may proceed to block 555.

At block 515, the transmitter signal frequency may be determined.

At block 520, it may be determined whether the measured frequency is within an allowed range of frequencies. If so, method 500 may proceed to block 530. Otherwise, method 500 may proceed to block 525.

At block 525, it may be determined that noise is present in the system. The noise may be characterized by deviations of the measured frequency from the allowed range of frequencies, or by further analysis, discussed below. Block 525 may proceed to block 570.

At block 530, a receiver signal amplitude may be determined.

As block 535, it may be determined whether the receiver signal is saturated, approaching saturation, or otherwise larger than an expected, designed quantity of the amplitude. If so, method 500 may proceed to block 525. Otherwise, method 500 may proceed to block 540.

At block 540, an impedance that should be sufficient to stop oscillation of the receiver may be applied to the receiver. This may cause an intended zero-oscillation state of the receiver.

At block 545, it may be determined whether the receiver is still oscillating. If so, method 500 may proceed to block 525. Otherwise, method 500 may proceed to block 550.

At block 550, it may be determined that the capacitance between the receiver and the transmitter has been definitively sensed as above a capacitance threshold indicating an approach or touch of a body to the sensing system. Method 500 may terminate.

At block 555, it may be determined whether the receiver output is saturated. If so, method 500 may proceed to block 525. Otherwise, method 500 may proceed to block 560.

At block 560, it may be determined that the capacitance between the receiver and the transmitter has been definitively sensed as below a capacitance threshold indicating an approach or touch of a body to the sensing system. Method 500 may terminate.

At block 570, an impedance that should be sufficient to stop oscillation of the receiver may be applied to the receiver. This may cause an intended zero-oscillation state of the receiver. Transmitter and receiver signals may be recorded as they exist in this state and stored or otherwise used to generate a noise profile.

Although example examples have been shown above, changes, additions, subtractions, or other permutations may be made to these examples without departing from the spirit and scope of the present disclosure, according to the knowledge and ability of one of ordinary skill in the art.

The invention claimed is:

1. A sensor system, comprising:
a receiver circuit including a receiver electrode;
a transmitter electrode; and
control logic;
wherein:
the receiver circuit is configured to oscillate when a capacitance measurement reaches a capacitance threshold;
the capacitance measurement is to include capacitance between the receiver electrode and the transmitter electrode, the capacitance to indicate a touch or proximity to the sensor system;
the capacitance measurement is to be performed while the transmitter electrode is deactivated; and
the control logic is configured to:
determine an amplitude of a transmitter electrode output signal;
based on a determination that the amplitude of the transmitter electrode output signal is greater than an amplitude threshold, determine a frequency of the transmitter electrode output signal;
determine whether the frequency of the transmitter electrode output signal is within an allowed frequency range; and
based on a determination that the frequency of the transmitter electrode output signal is not within the allowed frequency range, determine that noise is present in the system.

2. The sensor system of claim 1, wherein the control logic is further configured to:
based on a determination that the frequency of the transmitter electrode output signal is within the allowed frequency range, determine an amplitude of a receiver electrode output signal; and
determine whether noise is present based upon the amplitude of the receiver electrode output signal.

3. The sensor system of claim 2, wherein the control logic is further configured to:
determine whether the amplitude of the receiver electrode output signal is indicative of output saturation; and
based upon a determination that the receiver electrode output signal is indicative of output saturation, determine that noise is present in the system.

4. The sensor system of claim 2, wherein the control logic is further configured to:
apply a zero-oscillation state impedance to the receiver electrode; and
determine whether the receiver electrode output signal indicates oscillation of the receiver electrode; and determine that noise is present in the system based on an indication of oscillation of the receiver electrode.

5. The sensor system of claim 2, wherein the control logic is further configured to:
apply a zero-oscillation state impedance to the receiver electrode;
determine whether the receiver electrode output signal indicates oscillation of the receiver electrode; and
determine that the capacitance measurement is correctly observed above the capacitance threshold based upon the determinations that the receiver electrode output signal indicates oscillation of the receiver electrode, and that the transmitter electrode output signal is within the allowed frequency range.

6. The sensor system of claim 5, wherein the determination that the capacitance measurement is above the capacitance threshold is further based on a determination that the receiver electrode output signal is not indicative of output saturation.

7. The sensor system of claim 1, wherein the control logic is further configured to:
determine that the amplitude of the transmitter electrode output signal is less than the amplitude threshold;
based on the determination that the amplitude of the transmitter electrode output signal is less than the amplitude threshold, determine whether a receiver electrode output signal is saturated; and
based on a determination that the receiver electrode output signal is not saturated, and upon the determination that the amplitude of the transmitter electrode output signal is less than the amplitude threshold, determine that the capacitance measurement is correctly observed below the capacitance threshold.

8. The sensor system of claim 1, wherein the control logic is further configured to, based on a determination of noise in the sensor system:
apply a zero-oscillation state impedance to the receiver electrode; and
record the transmitter electrode output signal after application of the zero-oscillation state impedance to characterize the noise.

9. The sensor system of claim 8, wherein the control logic is further configured to record a receiver electrode output signal after application of the zero-oscillation state impedance to characterize the noise.

10. A method of operating a sensor system with a transmitter electrode and a receiver electrode, the method comprising:
determining a capacitance measurement of a capacitance between a receiver electrode and a transmitter electrode, the capacitance to indicate a touch or proximity to the sensor system;
determining an amplitude of a transmitter electrode output signal;
based on a determination that the amplitude of the transmitter electrode output signal is greater than an amplitude threshold, determining a frequency of the transmitter electrode output signal;
determining whether the frequency of the transmitter electrode output signal is within an allowed frequency range; and based on a determination that the frequency of the transmitter electrode output signal is not within the allowed frequency range, determining that noise is present in the system.

11. The method of claim 10, further comprising:
based on a determination that the frequency of the transmitter electrode output signal is within the allowed frequency range, determining an amplitude of a receiver electrode output signal; and
determining whether noise is present based upon the amplitude of the receiver electrode output signal.

12. The method of claim 11, further comprising:
determining whether the amplitude of the receiver electrode output signal is indicative of output saturation; and
based upon a determination that the receiver electrode output signal is indicative of output saturation, determining that noise is present in the system.

13. The method of claim 11, further comprising:
applying a zero-oscillation state impedance to the receiver electrode; and
determining whether the receiver electrode output signal indicates oscillation of the receiver electrode; and
determining that noise is present in the system based on an indication of oscillation of the receiver electrode.

14. The method of claim 11, further comprising:
applying a zero-oscillation state impedance to the receiver electrode;
determining whether the receiver electrode output signal indicates oscillation of the receiver electrode; and
determining that the capacitance measurement is correctly observed above the capacitance threshold based upon the determinations that the receiver electrode output signal indicates oscillation of the receiver electrode, and that the transmitter electrode output signal is within the allowed frequency range.

15. The method of claim 14, the determination that the capacitance measurement is above the capacitance threshold is further based on a determination that the receiver electrode output signal is not indicative of output saturation.

16. The method of claim 10, further comprising:
determining that the amplitude of the transmitter electrode output signal is less than the amplitude threshold;
based on the determination that the amplitude of the transmitter electrode output signal is less than the amplitude threshold, determining whether a receiver electrode output signal is saturated; and
based on a determination that the receiver electrode output signal is not saturated, and upon the determination that the amplitude of the transmitter electrode output signal is less than the amplitude threshold, determining that the capacitance measurement is correctly observed below the capacitance threshold.

17. The method of claim 10, further comprising, based on a determination of noise in the sensor system:
applying a zero-oscillation state impedance to the receiver electrode; and
recording the transmitter electrode output signal after application of the zero-oscillation state impedance to characterize the noise.

18. The method of claim 17, further comprising recording a receiver electrode output signal after application of the zero-oscillation state impedance to characterize the noise.

* * * * *